United States Patent [19]

Newman et al.

[11] Patent Number: 4,678,150
[45] Date of Patent: Jul. 7, 1987

[54] DETACHABLE FOAM-BORNE MOUNTING METHOD

[76] Inventors: Lola Newman; Joseph Zelasko, both of 1613 W. Carol Ave., Mesa, Ariz. 85202

[21] Appl. No.: 915,978

[22] Filed: Oct. 6, 1986

[51] Int. Cl.$^4$ .............................................. A47H 1/10
[52] U.S. Cl. ................................. 248/205.3; 248/467; 403/268; 403/361; 29/432
[58] Field of Search ............... 248/205.3, 206.5, 205.2, 248/467; 403/268, DIG. 1, 361; 29/432

[56] References Cited

U.S. PATENT DOCUMENTS

| 4,333,974 | 6/1982 | Davis | 29/432 X |
| 4,593,878 | 6/1986 | Stewart | 248/205.3 |
| 4,611,716 | 9/1986 | Sorlien | 248/206.3 |

*Primary Examiner*—Ramon O. Ramirez
*Attorney, Agent, or Firm*—Robert A. Hirschfeld

[57] ABSTRACT

Separable mounting elements are adhesively affixed to a rigid foam display base and to a display surface. One element is affixed within a cavity anterior the foam base, the front of which penetratingly holds flowers and the like. A shield or cup is placed intermediate the mounting element and the foam, to resist tearing or distension of the foam, to allow non-dissolving adhesive on the foam side of the shield and other suitable adhesive between shield and mounting element, and to aid in non-rotatingly indexing the foam to a display surface. A corresponding second mounting element is first indexingly located by mating to the first mounting element; a third suitable variety of adhesive is applied to them join same to the display surface. Thereafter, the display may be easily separated from and restored to the display surface, or replaced by an alternate display.

In a preferred embodiment, at least two spatially separated mounting loci are employed to torsionally resist rotation of display with respect to display surface.

20 Claims, 3 Drawing Figures

DETACHABLE FOAM-BORNE MOUNTING METHOD

TECHNICAL FIELD

The invention relates to methods for mounting foam-borne displays.

The invention relates more particularly to a method for detachably mounting a foam-borne display to a display surface.

PRIOR ART

In the past, rigid bases of penetrable foam have been utilized by artisans to create floral displays and the like, wherein the displayed matter is held in fixed juxtaposition by insertion of flower stems, wires and the like into esthetically selected loci in the foam base.

It is desirable to be able to mount such foam bases upon display surfaces, such as an upright panel or mirror. This is commonly accomplished by directly gluing the base to the display surface. Thereafter, little can be done to modify the location or orientation of the resultant display; it is difficult to dust or otherwise clean such a display.

It is further desirable to be able to replace one foam-base-mounted display with another, according to seasonal or esthetic needs.

Shipment of a fully assembled display surface and display, such as a floral arrangement upon a mirror, may be cumbersome and permit damage.

If a detachable mount is attempted, it may be difficult to replicate the original mounting locus or relative angular orientation when reassembling; detachable mounts may further suffer from unwanted rotation of the display with respect to the display surface.

When the foam base supports the weight of the displayed matter, mounting hardware often tears or distends the foam where attached, resulting in loss of durability.

Rigid foam, such as that sold commercially under the mark "Styrofoam", is subject to being dissolved by the solvents in certain adhesives; however such adhesives are preferable for secure attachment to the materials from which attachment hardware may be made. Thus, there may be a conflict or compromise in selection of adhesives.

It is therefore an object of the invention to provide a detachable foam-borne mounting method permitting separate shipment of display and display surface.

Another object of the invention is to provide a detachable foam-borne mounting method facilitating dusting or cleaning while disassembled.

A further object of the invention is to provide a detachable foam-borne mounting method which results in torsional resistance to rotation of the display with respect to the display surface.

Still another object of the invention is to provide a detachable foam-borne mounting method which resists tearing or distension of the foam base adjacent the mounting hardware.

A still further object of the invention is to provide a detachable foam-borne mounting method optimizing choice of adhesives to the materials adhered.

Yet another object of the invention is to provide a detachable foam-borne mounting method wherein the same hardware utilized to protect against foam tearing or distension simultaneously functions to provide an indexing and anti-rotation function.

DISCLOSURE OF THE INVENTION

Separable mounting elements are adhesively affixed to a rigid foam display base and to a display surface. One element is affixed within a cavity anterior the foam base, the front of which penetratingly holds flowers and the like. A shield or cup is placed intermediate the mounting element and the foam, to resist tearing or distension of the foam, to allow the use of non-foam-dissolving adhesive on the foam side of the shield, to allow use of a more suitable adhesive between shield and mounting element, and to aid in non-rotatingly indexing the foam to a display surface. A corresponding second mounting element is first indexingly located by mating to the first mounting element; a third suitable variety of adhesive is applied to then join same to the display surface. Thereafter, the display may be easily separated from and restored to the display surface, or replaced by an alternate display.

In a preferred embodiment, at least two spatially separated mounting loci are employed to torsionally resist rotation of display with respect to display surface.

BEST MODE FOR CARRYING OUT THE INVENTION

Figure 1:
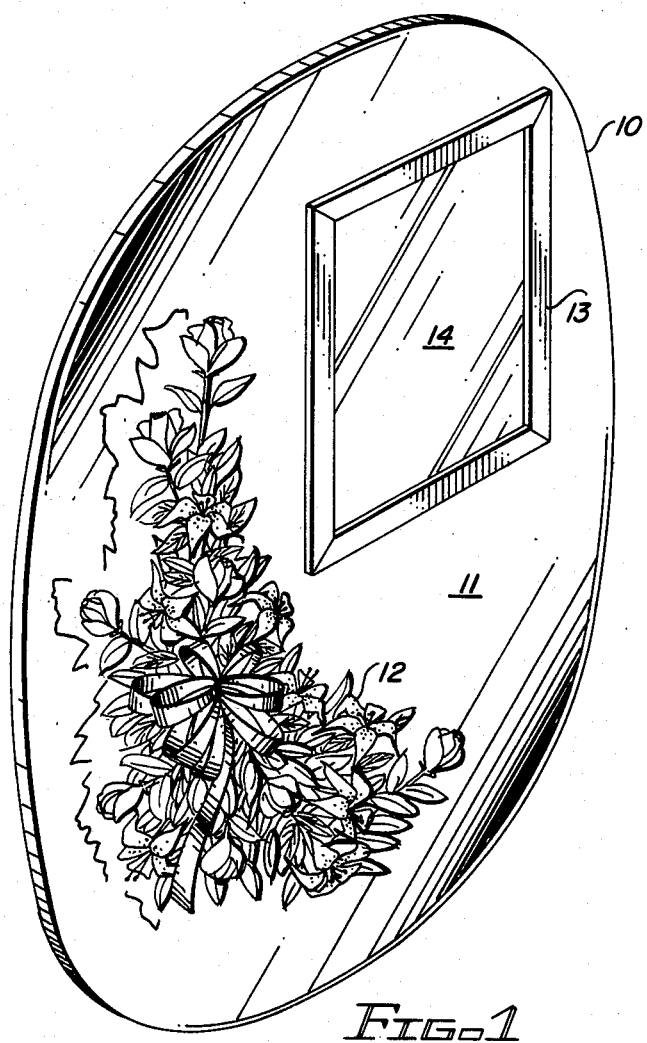
FIG. 1 is a perspective view of a typical display mounted according to the disclosed method.

For the purposes of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device; and such further applications of the principles of the invention as illustrated herein being contemplated as would normally occur to one skilled in the art to which the invention relates.

In FIG. 1, the product of practice of the disclosed method is generally indicated by number 10. A display surface 11, shown as a mirror 11, supports a floral display 12, as well as picture frame 13 enclosing picture 14.

Figure 3:
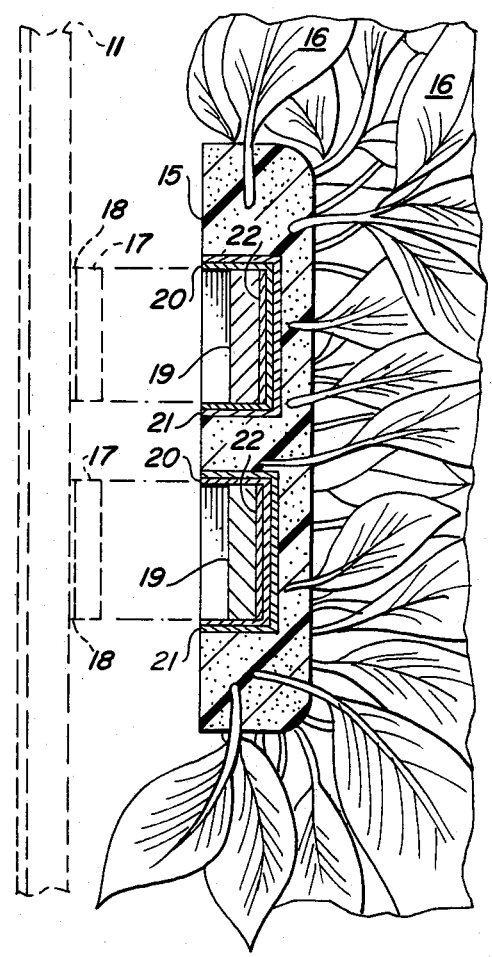
FIG. 3 is a side cross-sectional view of FIG. 2 along lines 3—3.
Figure 2:
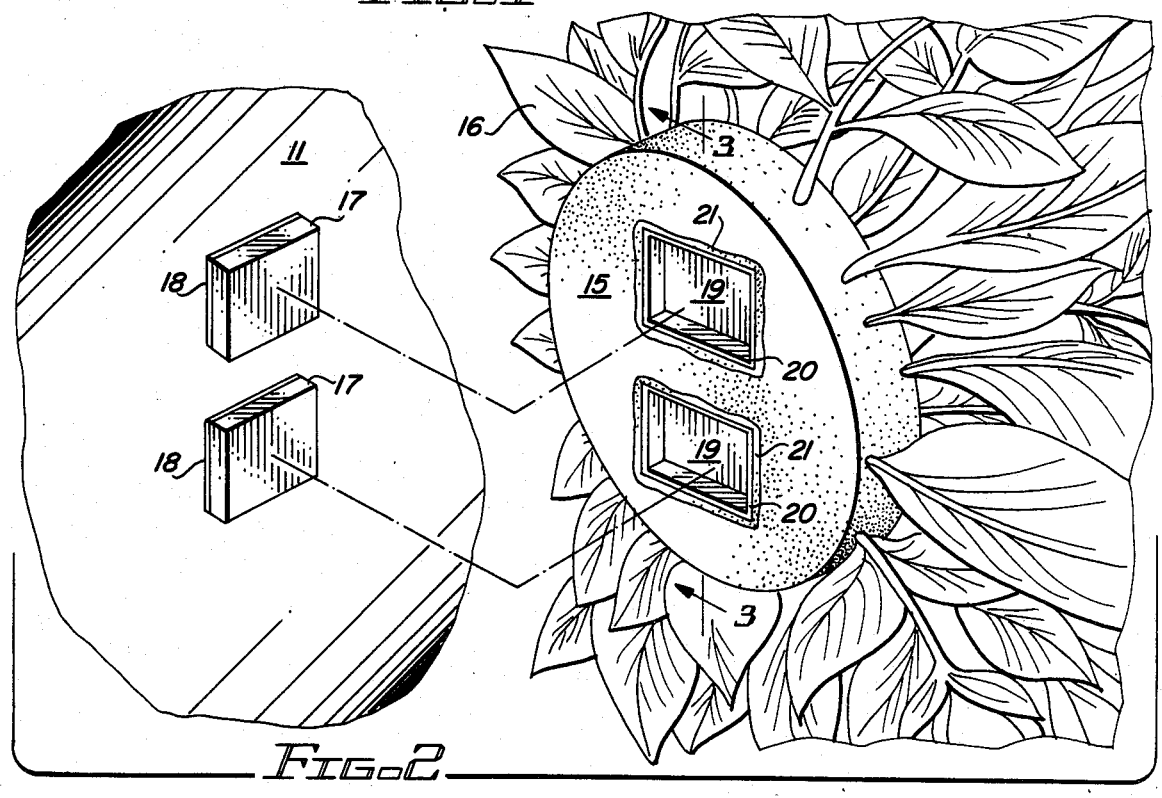
FIG. 2 is an exploded perspective view of the product of practice of the disclosed method.

The particular method steps set forth below result in the product shown in FIGS. 2 and 3. In the embodiment illustrated, floral display 16 is penetratingly inserted, as is known in the art, into the rigid foam base 15. The rear of base 15 (not separately indicated) is obverse from the portion into which display 16 is inserted, and contains shield-engagement voids or cavities (not separately numbered) into which first adhesive 21 is injected. Adhesive 21 is chosen so as not to dissolve the foam of base 15.

Intermediate cup or shield 20 performs in the finished structure several simultaneous functions: It provides mechanical strength to prevent tearing or distension of the foam; it allows a more suitable adhesive 22 to adhere between shield 20 and first mounting element 19, compared to the non-foam-dissolving adhesive 21; and it provides in the embodiment shown, a mount-engagement cavity or recess (not separately indicated) indexing the base 15 to second mounting element 17. The geometrical shape of shield 20 is non-round, to resist relative rotation when only one set of mounting elements 17,19 are used.

Mounting element 17 is shown affixed by yet a third optimized adhesive 18 to glass mirror/display surface 11.

A pair of spatially separated sets of mounting elements 17,17,19,19 are shown; as would be apparent to one skilled in the art, such structure further resists unwanted angular rotation between base 15 and display surface 11.

While not separately illustrated, the method steps described below will be clear from the drawings shown, to one skilled in the art:

(a) A penetrable rigid foam base 15 is provided, which has a display surface and an obverse rear surface. The rear surface has at least one shield-engagement cavity.

(b) Into each shield-engagement cavity, a first adhesive 21 is injected. The foam base 15 is insoluble in first adhesive 21.

(c) A shield 20 is provided, which because of its own conformal cavity is indexable to subsequently installed second mount 17. The shield is insoluble in first adhesive 21.

(d) Into each said shield-engagement cavity the corresponding shield 20 is inserted, the first adhesive 21 intermediately adhering the shield 20 to base 15 within the conformal shield-engagement cavity.

(e) Into each mount-engagement cavity is injected a second adhesive 22, in which the shield is insoluble.

(f) First mount element 19 is provided, corresponding to each shield 20. First mount element 19 is insoluble in second adhesive 22.

(g) Into each mount-engagement cavity the corresponding first mount element 19 is inserted, the second adhesive 22 intermediately adhering first mount element 19 to shield 20 within the conformal mount-engagement cavity.

(h) Second mount element 17 is provided, corresponding to each first mount element 19, and detachably, indexingly and non-rotatingly mateable thereto.

(i) A display surface 11 is provided.

(j) Display matter 16 is inserted as desired for visual effect into foam base 15.

(k) The respective mount elements 17,19, are joined.

(l) A third adhesive 18, chosen to be suitable and non-dissolving, is applied on one or both of the to-be-mated surfaces of the mounting surface 11 and second mount element 17.

(m) The second mount element 17 is joined while still mated to mount element 19, at a desired location by adhesive 18 to display surface 11.

From the foregoing steps, it may be seen that the display generally referred to as 12 in FIG. 1 may now easily be detached from mounting surface 11 for cleaning or replacement.

To permit interchangeability of displays, the following steps are also performed:

(n) Steps (a) through (g) and (j) are repeated to create at least one alternative display (not separately illustrated). Shield engagement cavity loci, and thus the relative loci of the mounting elements 17,19 are also replicated in the alternative display.

(o) The display 12 formed in steps (a) through (m) is released from the display surface.

(p) The alternative display is substituted.

In one embodiment, mount elements 17,19 are mutually attracting magnets. In alternative embodiments, as will be understood by those skilled in the art, one of mounting elements 17,19 is a magnet and the other a ferrous metal plate which the magnet attracts.

The illustration equally well depicts mounting elements 17,19, one of which is the hook element and the other the loop element of a hook-and-loop fastener such as that sold under the mark "Velcro".

When the both elements 17,19, or only element 19 is a magnet, shield 20 is optimally non-ferrous, nonmagnetically conducting material such as aluminum. When only element 17 is a magnet, elements 19 and 20 may be combined as a single, magnetically attractable metal. Otherwise, shield 20 may be molded plastic and the like.

Those skilled in the art will readily derive other embodiments of the invention drawn from the teachings herein. To the extent that such alternative embodiments are so drawn, it is intended that they shall fall within the ambit of protection provided by the claims appended hereto.

Having described our invention in the foregoing specification and the accompanying drawings in such a clear and concise manner that those skilled in the art may readily understand and easily practice the invention,

We claim:

1. A detachable foam-borne mounting method comprising the steps of:
    (a) providing a penetrable rigid foam base, said penetrable rigid foam base having a display surface, said penetrable rigid foam base having a rear surface thereupon obverse said display surface, said rear surface having at least one shield-engagement cavity;
    (b) injecting into each said shield-engagement cavity a first adhesive, said penetrable rigid foam base insoluble in said first adhesive;
    (c) providing shield means, said shield means having indexing means, said shield means insoluble in said first adhesive;
    (d) inserting into each said shield-engagement cavity said shield means, said first adhesive intermediately adhering said shield means to said penetrable rigid foam base within said shield-engagement cavity, said shield means conformal said shield-engagement cavity, said shield means having at least one mount-engagement cavity therein obverse said shield-engagement cavity;
    (e) injecting into each said mount-engagement cavity a second adhesive, said shield means insoluble in said second adhesive;
    (f) providing first mount means corresponding to each said shield means, said first mount means insoluble in said second adhesive;
    (g) inserting into each said mount-engagement cavity the corresponding said first mount means, said second adhesive intermediately adhering said first mount means to said shield means within said mount-engagement cavity, said first mount means conformal said mount-engagement cavity;
    (h) providing one of second mount means corresponding to each said first mount means, said second mount means detachably mateable to the corresponding said first mount means, said second mount means non-rotatingly indexable to one of the corresponding said shield means and the corresponding said first mount means;

(i) providing a display surface;

(j) penetratingly affixing display matter to said penetrable rigid foam base;

(k) releasably matingly indexingly joining each said first mount means to each corresponding said second mount means;

(l) applying onto at least one of said display surface and said second mount means a third adhesive means, said display surface insoluble in said third adhesive, said second mount means insoluble in said third adhesive means;

(m) emplacing said second mount means at a desired location upon said display surface, said third adhesive affixingly intermediate said second mount means and said display surface.

2. The detachable foam-borne mounting method of claim 1 wherein said shield means comprises non-ferrous metal cup means, said first mount means comprising first magnet means, said second mount means comprising second magnet means, said first magnet means magnetically attracting said second magnet means.

3. The detachable foam-borne mounting method of claim 1 wherein said shield means comprises non-ferrous metal cup means, said first mount means comprising first magnet means, said second mount means comprising ferrous plate means, said first magnet means magnetically attracting said ferrous plate means.

4. The detachable foam-borne mounting method of claim 1 wherein said first mount means comprises ferrous plate means, said second mount means comprising second magnet means, said ferrous plate means magnetically attracted to said second magnet means.

5. The detachable foam-borne mounting method of claim 1 wherein said shield means comprises metal cup means, said first mount means and said second mount means comprising in combination releasable hook-and-loop fastener means.

6. The detachable foam-borne mounting method of claim 1 wherein said display matter comprises a floral display, said floral display having flower stems, said flower stems penetratingly affixed to said rigid foam base.

7. The detachable foam-borne mounting method of claim 1 wherein said display surface comprises mirror means.

8. The detachable foam-borne mounting method of claim 7 wherein said display surface further comprises picture frame means.

9. The detachable foam-borne mounting method of claim 1 wherein said rear surface of said penetrable rigid foam base has at least two spatially separated said shield-engagement cavities, the corresponding said shield means, first mount means and second mount means in combination torsionally resistant to rotation of said mounting base means with respect to said display surface.

10. The detachable foam-borne mounting method of claim 1 further comprising the steps of:

(n) providing by replication of steps (a) through (g) and (j) at least one alternative display, the relative locus in said alternative display of each said shield-engagement cavity corresponding to the locus of each said shield-engagement cavity of step (a);

(o) releasing the display formed in steps (a) through (m) from said display surface;

(p) joining by means of said corresponding first mount means and said second mount means said alternative display to said display surface.

11. The product of practicing the method of claim 1.
12. The product of practicing the method of claim 2.
13. The product of practicing the method of claim 3.
14. The product of practicing the method of claim 4.
15. The product of practicing the method of claim 5.
16. The product of practicing the method of claim 6.
17. The product of practicing the method of claim 7.
18. The product of practicing the method of claim 8.
19. The product of practicing the method of claim 9.
20. The product of practicing the method of claim 10

* * * * *